(12) United States Patent
Althaus et al.

(10) Patent No.: US 7,677,046 B2
(45) Date of Patent: Mar. 16, 2010

(54) METHOD FOR STARTING A PRESSURE STORAGE PLANT

(75) Inventors: Rolf Althaus, Herrliberg (CH); Markus Gruenenfelder, Ennetbaden (CH); Christian Henssler, Warwick (GB); Patrik Alfons Meier, Baden (CH); Hans-Juergen Peters, Waldshut (DE); Urs Zinniker, Oberrohrdorf (CH)

(73) Assignee: Alstom Technology Ltd, Baden (CH)

( * ) Notice: Subject to any disclaimer, the term of this patent is extended or adjusted under 35 U.S.C. 154(b) by 199 days.

(21) Appl. No.: 11/889,303

(22) Filed: Aug. 10, 2007

(65) Prior Publication Data

US 2008/0022687 A1  Jan. 31, 2008

Related U.S. Application Data

(63) Continuation of application No. PCT/EP2006/050582, filed on Feb. 1, 2006.

(30) Foreign Application Priority Data

Feb. 10, 2005 (CH) .................................. 00214/05

(51) Int. Cl.
*F02C 6/18* (2006.01)
*F02C 7/26* (2006.01)

(52) U.S. Cl. ................. 60/778; 60/646; 60/727
(58) Field of Classification Search ............. 60/39.183, 60/407, 646, 727, 778, 786, 788
See application file for complete search history.

(56) References Cited

U.S. PATENT DOCUMENTS

| 4,237,692 A | * | 12/1980 | Ahrens et al. ................. 60/659 |
| 4,885,912 A | * | 12/1989 | Nakhamkin .................. 60/652 |
| 5,845,479 A | * | 12/1998 | Nakhamkin et al. ........... 60/777 |
| 2003/0131599 A1 | | 7/2003 | Gerdes | |

FOREIGN PATENT DOCUMENTS

| DE | 195 18 093 A1 | 11/1996 |
| DE | 10 2004 034 657 A1 | 2/2005 |
| FR | 2 188 056 A | 1/1974 |

OTHER PUBLICATIONS

PCT/ISA/210.

* cited by examiner

*Primary Examiner*—Louis J Casaregola
(74) *Attorney, Agent, or Firm*—Buchanan Ingersoll & Rooney PC

(57) ABSTRACT

An air storage plant comprises a storage volume for a pressurized storage fluid, a storage fluid expansion machine and a generator which is arranged with the expansion machine on a common power train. During the start up of the air storage plant, the generator is operated at least temporarily electromotively in order to assist the acceleration of the rotor of the expansion machine. This allows a more rapid acceleration of the expansion machine to the rated rotational speed and, consequently, earlier synchronization and an earlier power output than acceleration caused solely by the storage fluid flowing through.

13 Claims, 2 Drawing Sheets

METHOD FOR STARTING A PRESSURE STORAGE PLANT

TECHNICAL FIELD

The invention relates to a method for starting a pressure storage plant according to the preamble of claim 1. It relates, furthermore, to a pressure storage plant which is suitable for carrying out the method according to the invention. Furthermore, a control unit is specified, which is correspondingly suitable and configured for causing a pressure storage plant to carry out a method according to the invention, a digital code which is suitable for configuring the control unit correspondingly, and also a data carrier on which the code is stored in executable form and/or as a source code.

PRIOR ART

Pressure storage plants have become known from the prior art, in which a pressurized storage fluid, in particular air, is stored in a storage volume and is expanded, as required, in an expansion machine, along with a power output. An air storage plant became known, for example, from US 2003/0131599 A1. It became known, furthermore, also from this document, to supply heat to the storage fluid prior to expansion in the expansion machine, with the result that the power output of the expansion machine rises while the storage fluid mass flow remains the same. It has become known from the prior art to start up the expansion machine by applying storage fluid to it and to run it up to the rated rotational speed. Acceleration is in this case brought about solely by the conversion of work during the expansion of the storage fluid. This type of starting is known, for example, from steam turbine technology, where, for starting, an increasing steam mass flow is applied to the steam turbine. Starting devices for starting the turbine may then be dispensed with. In a turbine, however, the absorption capacity is limited, so that only a limited mass flow or volume flow can be put through, and, under the conditions, discussed here, of a turbine with very low rotational speeds, the inlet volume flow usually constitutes the limiting factor. The absorption capacity is, inter alia, a function of the rotational speed and is the lower, the lower the rotational speed is. The result of this is that, at low rotational speeds, only a low mass flow can be put through a turbine, with the result that the power available for accelerating the turbine rotor is limited. Furthermore, at low rotational speeds of a turbine, the enthalpy reduction and consequently the temperature drop between the inlet and outlet of the turbine are only slight. However, the rear stages of, for example, a steam turbine which is used as an expansion machine of a pressure storage plant are designed for low temperatures. As a result of this, even in the case of a hot start of the expansion machine in which the inlet temperature of the expansion machine could be increased quickly, limitation on account of the permissible temperature at the outlet of the turbine has to be borne in mind at low rotational speeds of the expansion machine. The consequence of this, in turn, is that more storage fluid is required until the rated rotational speed is reached.

The acceleration power to be provided by the expansion machine for starting by the expansion of the storage fluid is therefore limited, thus entailing a comparatively slow acceleration of the expansion machine to its rated rotational speed and to the synchronization of the generator of the expansion machine with the network and, consequently, to the first power output. In the present-day liberalized electricity markets, however, the ability to be able to deliver power to an electricity network quickly is a substantial competitive advantage.

PRESENTATION OF THE INVENTION

A method for starting a pressure storage plant of the type initially mentioned is specified, then, which, according to one aspect among many of the present invention, avoids the disadvantages of the prior art. More specifically, the method is to make it possible to introduce the pressure storage plant into the electricity network as quickly as possible and with as high a power gradient as possible, without overtaxing the rapid startability of the expansion machine, which could drastically shorten its service life.

The method described in claim 1 and the pressure storage plant claimed in the independent device claim are capable, in addition to further advantages, of meeting these requirements.

According to the method specified here, therefore, the acceleration of the expansion machine is assisted, during starting, by means of the electromotively operated generator. In comparison with the acceleration of an air turbine which is conventional according to the prior art and in which the latter is accelerated solely by the flowing working fluid, therefore, a markedly more rapid acceleration of the expansion machine and therefore a more rapid temperature rise of the inflowing working fluid and, along with this, finally, an earlier power output of the expansion machine into the electricity network are made possible. Thus, the expansion machine is accelerated more rapidly, and the generator can be synchronized more rapidly with the network, that is to say the pressure storage plant is more rapidly capable of the output of the power into the network. In order to implement this, a pressure storage plant for carrying out the specified method comprises an starting device which can be connected to the generator, arranged on a common power train with the expansion machine, and which makes it possible to operate the generator electromotively. This is in this case, for example, an starting device which makes it possible to operate the generator at a rotational speed which has any desired ratio to the frequency of an electricity network. For this purpose, for example, static frequency converters, SFC, are known.

In one embodiment of the method, a minimal storage fluid mass flow is supplied to the expansion machine when the latter is still at a standstill or rotor turning, and the expansion machine is accelerated from standstill or from rotor turning, preferably with the assistance of the electromotively operated generator. Owing to early admission of storage fluid, a harmful ventilation of a turbine used as an expansion machine is avoided. Moreover, in a cold start, the turbine is heated up more quickly. During rotor turning or rotor barring, the rotor of a turbine which is not in operation is rotated in the casing at a low rotational speed of, for example, less than 1 revolution per minute. A distortion of the rotor of a turbine during cooling after shutdown is thereby avoided.

In one embodiment of the method, the temperature of the storage fluid provided for the expansion machine is controlled such that the temperature and/or the temperature gradient of the expanded storage fluid and/or the temperature gradient of the rotor temperature and/or of the casing temperature at the outlet of the expansion machine remain below a limit value or do not exceed the limit value. This is important at low rotational speeds and in the case of low powers of the expansion machine and, in particular, of an air turbine. At low rotational speeds of a turbine, that is to say, in particular, during starting and acceleration, for reasons of stage kinematics the mass specific enthalpy conversion of the working fluid is low, and therefore the temperature difference between the inlet and outlet of the turbine is small. That is to say, the fluid temperature at the outlet is comparatively near to the fluid temperature at the inlet, which is why, without suitable measures, it is possible, for example, to have a thermal overloading of the outlet region designed for low temperatures. In the case of a low power of an air turbine operated as an expansion machine, a similar problem arises. The low mass flow results in a low pressure ratio and consequently in a comparatively small enthalpy and temperature reduction, and, because of this, even at the rated rotational speed, but with a low power, of an air turbine, the temperature at the turbine outlet is near to the inlet temperature, as compared with full-load operation. Thus, even at the rated rotational speed and in idling operation or with low power, there is the potential risk of overheating at the turbine outlet. It is therefore advantageous if, during the acceleration of an air turbine to the rated rotational speed and during loading at powers below full-load power and, in particular, below 10% or 25% to 50% of the full-load power, the temperature of the storage fluid flowing into the expansion machine is controlled in such a way that specific temperatures and/or temperature gradients at the outlet of the expansion machine are not overshot. In this case, on the one hand, the temperature at the outlet may be determined as a function of the temperature at the inlet or the temperature at the inlet may be determined as a function of the temperature at the outlet and, further, as a function of the pressure ratio across the expansion machine and/or of the power and/or rotational speed of the expansion machine.

Similarly, in developments of the method described here, the temperature of the storage fluid mass flow supplied to the expansion machine is controlled such that the temperature and/or the temperature gradient of the storage fluid at the inlet into the expansion machine remain/remains below a limit value. In another development, the temperature of the storage fluid mass flow supplied to the expansion machine is controlled such that the temperature gradient of the rotor temperature and/or of the casing temperature at the inlet of the expansion machine remain/remains below a limit value.

These limit value regulations may, of course, also be used in a cascading manner, in such a way that in each case one of the values which is nearest to the limit value takes over the command of regulation.

It is possible, and may prove advantageous, to define at least one of the abovementioned limit values dynamically and variably as a function of the current thermal state of the expansion machine during operation.

Further embodiments of the method described here comprise controlling the temperature of the storage fluid mass flow supplied to the expansion machine as a function of thermal states at the inlet into the expansion machine and setting the rotational speed of the expansion machine by means of the electromotively assisted rotor acceleration such that the temperature and/or the temperature gradient of the expanded storage fluid at the outlet from the expansion machine and/or the gradient of the casing temperature and/or of the rotor temperature at the outlet of the expansion machine remain below permissible maximum values.

In another development of the method, a desired temperature of the storage fluid flowing to the expansion machine is determined as a function of the thermal state of the expansion machine.

Further developments of the method and of the pressure storage plant may be gathered from the subclaims and from the exemplary embodiments illustrated below.

The control of the pressure storage plant for carrying out a method according to the method claims takes place, for example, by means of a control unit which has at least one signal output and preferably a plurality of signal outputs and signal inputs, at least one signal output conducting an actuation signal to an actuating element of the pressure storage plant, thus causing the pressure storage plant to carry out a method described above. For this purpose, the control unit generates, for example, a sequence of control signals, or it generates control signals according to a chronological flow chart. If the control is operated within a closed control loop, the control unit forms the control signals as a function of at least one input signal which is present at a signal input. In order to fulfill these tasks, the control unit must be configured correspondingly. The configuration of the control unit, for example to define a functional relation for the formation of control variables from input variables, takes place, for example, via a processor in which a digital program is loaded which is suitable for configuring the control unit in such a way that it causes a pressure storage plant to carry out a method described above. The invention, to that extent, also comprises a control unit which is configured to cause a pressure storage plant to carry out a method described above, a digital code which is suitable for configuring a control unit in such a way that it causes the pressure storage plant to carry out the method, and a data carrier on which a digital code of this type is stored as an executable instruction sequence or as a source code. A data carrier is to be understood as meaning not only magnetic or optical data carriers, to be mentioned by way of example, but also, in particular, non-volatile memory modules. These also include memory modules or correspondingly configured programmable logic modules which are built directly into the control unit. The list of data carriers is, of course, not conclusive.

BRIEF DESCRIPTION OF THE DRAWINGS

The invention is explained in more detail below with reference to exemplary embodiments illustrated in the drawing in which, in particular.

For an understanding of the invention, non-essential details have been omitted, but are also implicitly disclosed directly for a person skilled in the art. The exemplary embodiments are purely instructive and are not to be used to restrict the invention characterized in the claims.

WAYS OF IMPLEMENTING THE INVENTION

Figure 1:
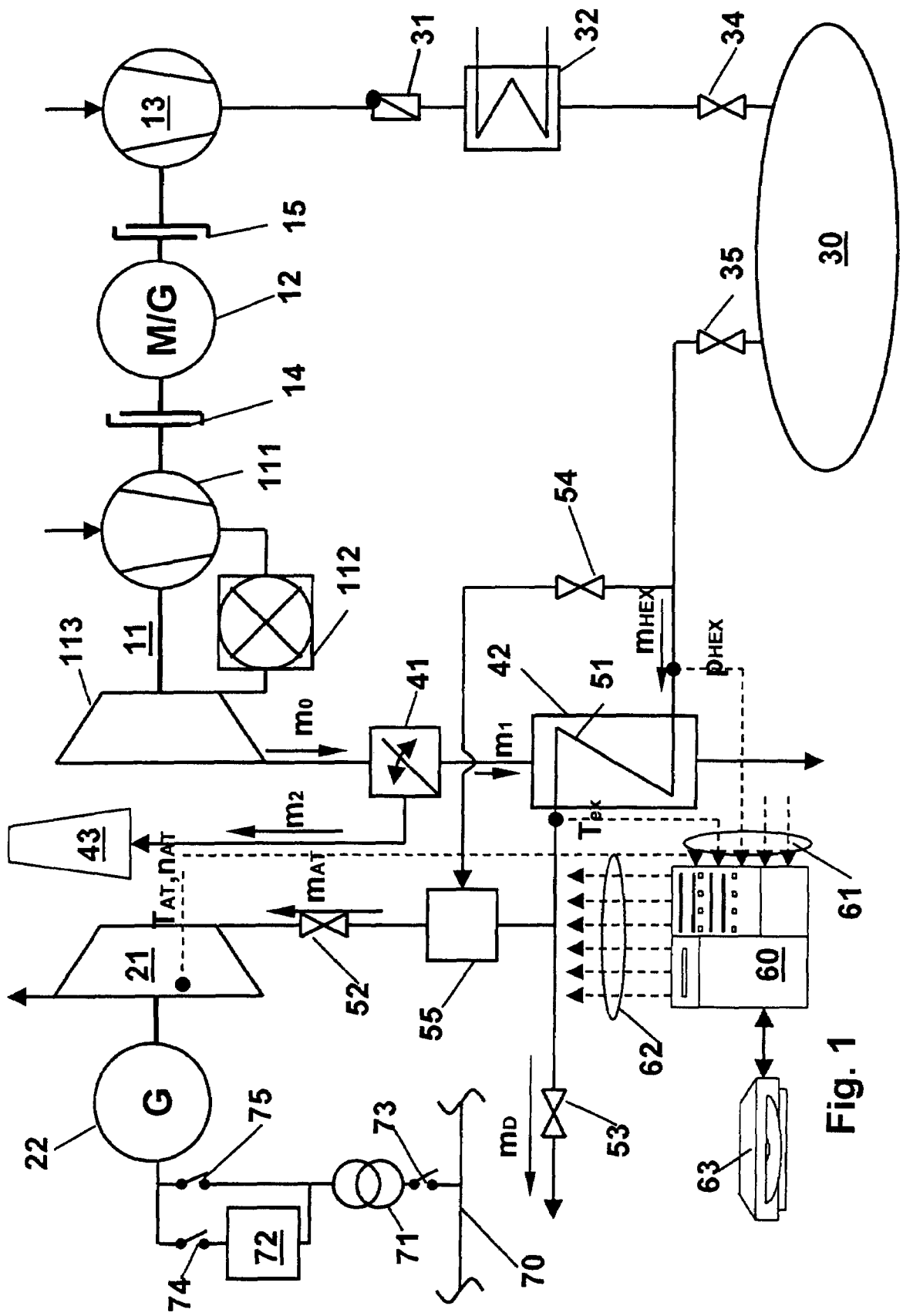
FIG. 1 shows a first example of a pressure storage plant.

FIG. 1 illustrates a first pressure storage plant suitable for carrying out a method described above. The pressure storage plant comprises essentially a gas turbo group 11 which is arranged with a motor/generator unit 12 and with a compressor 13 on a common power train. The motor/generator unit 12 can be operated both as a motor and as a generator. The compressor 13 serves for charging a pressure storage volume 30. Working fluid stored in this can be expanded, so as to perform work, in times of high electrical power demand, in the storage fluid expansion machine, air turbine, 21 which drives the generator 22. In particular, a steam turbine available as standard, as it were from stock, which has to be modified only slightly, is used as the air turbine. This results in a particularly economical solution. The electric machine 12 can be connected to the gas turbo group 11 and/or the compressor 13 by means of shiftable clutches 14, 15. In times of high electricity demand and to start up the gas turbo group, the clutch 14 is closed and the clutch 15 is opened. To start up the gas turbo group, the electric machine 12 is operated electromotively, accelerates the compressor 13 to a rotational speed at which an at least necessary mass flow is conveyed into the combustion chamber, and assists the acceleration of the gas turbo group to the rated rotational speed. To generate power, the electric machine 12 is operated as a generator and is driven by the gas turbo group 11. In times of high availability of electrical energy and at a correspondingly low electricity price, the clutch 15 is closed and the clutch 14 is opened. The machine 12 is operated electromotively and drives the compressor 13 in order by means of cheaply available power to charge the storage volume 30 with pressurized fluid, for example air, and, in times of high electrical power requirements and correspondingly high electricity prices, to utilize the energy thus stored again in the expansion machine 21 for power generation. The gas turbo group 11 is meanwhile usually at a standstill; however, it is also possible, in principle, to keep the gas turbo group 11 ready in idling operation. Furthermore, an operating state is possible in which both clutches 14 and 15 are closed; in this case, depending on the power rating of the components, either the gas turbo group 11 and the electric machine 12 jointly drive the compressor or the gas turbo group 11 is operated in order, on the one hand, to drive the electric machine 12 for power generation and, at the same time, the compressor 13. In this case, for example, the excitation of the machine 12 operated as a generator determines the allocation of the power of the gas turbo group to the compressor 13 and the machine 12. The possibility thus afforded of setting the useful power and the reactive power independently of one another by means of a variable excitation of the generator and a variable compressor power is likewise highly lucrative in liberalized electricity markets. It is also possible to open both clutches 14 and 15 and to cause the electric machine 12 in the electricity network to corotate without load and without drive, in order to provide the required reactive power components. It is likewise possible, in a way not illustrated, but readily familiar to a person skilled in the art, also to arrange the air turbine or, in general, an expansion machine on a common power train with a compressor and with an electric machine capable of being operated both as a generator and electromotively. In a similar way to the power train of the gas turbo group, shift clutches are then arranged between the expansion machine and the electric machine and between the compressor and the electric machine. The compressor is likewise switched in such a way that it conveys storage fluid into the storage volume 30. In this case, the compressor on the power train of the expansion machine may be connected both in parallel and in series with the compressor on the power train of the gas turbo group. In the process, the compressor on the power train of the expansion machine can be connected either in parallel or in series with the compressor on the power train of the gas turbine set. Dividing the entire compressor power in this way between two compressors permits high compressor power levels without having to arrange extremely long compressor power trains which are difficult to deal with dynamically; even though an arrangement of two compressors initially seems more costly than arranging just one compressor, the division of the compressor power starting from a certain power variable permits compressors which are available on a standard basis to be used without having to carry out difficult redesign measures for the rotor dynamics. The operation of the compressor and expansion machine and also the shifting states of the shift clutches will become obvious to a person skilled in the art from the statements regarding the power train of the gas turbo group. During the charging operation of the pressure storage plant, the shut-off element 34 is opened and the shut-off and/or actuating element 35 is normally closed. Fluid compressed by the compressor 13 is cooled in a cooler 32 and flows through the open shut-off element 34 into the storage volume 30. Furthermore, in this flow path, a nonreturn element 31 is arranged, which reliably prevents a backflow of fluid into the compressor. In the power mode of the pressure storage plant, the gas turbo group 11, which comprises a compressor 111, a combustion chamber 112 and a turbine 113, generates an exhaust gas mass flow $m_0$. The exhaust gas mass flow $m_0$ flows into a flow branching element 41 in which a controllable exhaust gas flap is arranged. By means of the flap arranged in the branching element 41, it is possible to divide the exhaust gas mass flow $m_0$ into a first part flow $m_1$ and second part flow $m_2$. The first part flow flows into a heat exchanger 42, through which storage fluid from the storage volume 30 can flow, in countercurrent to the exhaust gas, in a heat-receiving part. Thus, the storage fluid can be heated and the waste heat from the gas turbo group can be converted in the air turbine 21. The second part flow flows out via a stack 43. In the interests of good energy utilization, it is, of course, desirable to keep the second part flow, which flows out without any utilization of the waste heat, as low as possible. It is clear, to that extent, that one of the part flows may readily become zero. While the first part flow of the exhaust gas from the gas turbo group flows through a heat-discharging part of the heat exchanger 42, a heat-receiving part 51 of the heat exchanger can have storage fluid applied to it from the storage volume 30 via the actuating and/or shut-off element 35, which is also designated as a "Wellhead". The mass flow of the storage fluid which flows to the heat-receiving part 51 of the heat exchanger is designated by $m_{HEX}$. The storage fluid is conducted, downstream of the heat exchanger, to the expansion machine 21 via an actuating element 52. Furthermore, a mixer 55 is arranged, downstream of the heat exchanger, in the flow path of the storage fluid. Unheated storage fluid may be supplied to the mixer 55 via a bypass line of the heat exchanger. Consequently, the temperature of the storage fluid flowing to the expansion machine 21 can be reduced in the mixer 55. Furthermore, arranged downstream of the heat-receiving part of the heat exchanger is a blow-off element, bypass valve, 53, via which a blow-off mass flow or bypass mass flow $m_D$ of the storage fluid can be discarded, after flowing through the heat-receiving part 51 of the heat exchanger, in that, for example, in the case of air as storage fluid, it is released or recooled and conveyed back into the storage volume 30 by means of a compressor. A control unit 60 is arranged for controlling and regulating the storage plant. The control unit comprises an input interface receiving a multiplicity of input signals 61 which characterize the operating state of various components of the storage plant. The control unit 60 is configured in such a way that it forms from the input signals 61 control signals 62 which are transferred via an output interface to actuating elements of the storage plant. These include, for example, control variables for activating the shut-off and/or actuating elements 34, 35, 52, 53 and 54 or for the exhaust gas flap in the flow branching element 41. The configuration of the control unit 60 takes place, for example, via a processor, not illustrated, which is configured correspondingly by a digital code. This digital code is stored on a data carrier 63 and is loaded into the control unit, for example, during the starting of the control unit. As illustrated, the data carrier may be an external storage medium; however, a non-volatile memory module or another suitable storage medium may also be used as a data carrier. In the power mode of the storage plant, the heat exchanger 42 has flowing through it the hot exhaust gas mass flow of the gas turbo group, the temperature of which may reach, for example, values of 550 to 580° C. or 600° C., even deviations from these values readily being possible. The throughflow mass flow of the heat-receiving part 51 of the heat exchanger 42 is dimensioned such that the temperature $T_{ex}$ at the outlet from the heat exchanger does not exceed a permissible maximum value. This ensures that overheating of the heat exchanger apparatus is avoided. The controllable branching element 41 makes it possible, in this case, to operate the gas turbo group even when there is no storage fluid available. The overall exhaust gas mass flow is then discharged, bypassing the heat exchanger, via the stack 43. By means of the shut-off and/or actuating element 35, also designated as a "Wellhead", a constant pressure $p_{HEX}$ of, for example, 60 bar is set in the heat-receiving part of the heat exchanger; of course, variable pressures may also be set, in such a way that a sliding-pressure type of operation is implemented. During the operation of the expansion machine 21, the mass flow is set in such a way that the temperature of the storage fluid at the outlet from the heat exchanger corresponds to a desired value and lies, for example, 30° C. or 50° C. below the temperature of the exhaust gas of the gas turbo group. This allows the best possible utilization of the storage fluid, because a maximum mass-specific enthalpy gradient across the expansion machine 21 is set. During a cold start of the storage plant, it is then possible that the storage fluid expansion machine cannot, at the present temperature, absorb the mass flow required for the heat exchanger. If, for example, the expansion machine 21 used is a derivative of a steam turbine which has no heat protection shield, in particular on the rotor, and no cooling facility, it should only slowly be heated up and/or accelerated to the rated rotational speed, so that the permissible stresses in the rotor are not overshot, which could otherwise lead to serious mechanical damage. It is known, for example, to start up steam turbines under controlled stress. In this case, mechanical stresses in the rotor are determined, and acceleration to the rated rotational speed takes place the more slowly, the higher the stresses are. This is known as stress-controlled starting. Further limiting factors in the application of heated storage fluid upon the expansion machine may be, for example, temperature gradients at the inlet flange of the casing. A further limitation arises due to the temperature or a temperature gradient at the outlet from the expansion machine. This region is generally intended for low temperatures which, for example, lie below 100° C. and lower. However, at low rotational speeds, the temperature of the storage fluid flowing through the expansion machine falls only slightly on account of the stage kinematics, in such a way that, even when the temperature at the inlet of the expansion machine lies within a permissible framework, an exceeding of the permissible temperature at the outlet of the expansion machine can occur. Even in the case of low powers or in idling operation at the rated rotational speed, this effect may occur because of the low mass flow and the associated low pressure ratio of the expansion machine. Consequently, at least one temperature $T_{AT}$ of the expansion machine, for example a casing temperature, and/or a fluid temperature and/or a rotor temperature at the inlet and/or at the outlet of the expansion machine and/or another suitable temperature of the expansion machine and also the rotational speed $n_{AT}$ of the rotor of the expansion machine are measured and evaluated in the control unit 60. The control unit generates a control variable for the actuating element 52. The actuating element 52 adjusts the mass flow $m_{AT}$ of the expansion machine such that permissible temperature and/or rotational speed gradients are not overshot. That is to say, during the operation for starting the expansion machine 21, only a limited waste heat power of the gas turbo group can be utilized. In general, there is the possibility of bringing the gas turbo group only very slowly to a high power output and of thereby increasing only slowly the exhaust gas mass flow $m_0$ and the temperature of the exhaust gas. Apart from the restrictions which the operating regime of the gas turbo group 11 may entail in this respect, this means that the power output of the storage plant, overall, can be output into the network only with a long delay during cold starting. However, to be able to deliver power into the network quickly affords a substantial competitive advantage in the present-day liberalized electricity markets. A further possibility is to load the gas turbo group with its maximum power gradient while the actuating element 52 of the expansion machine 21 is controlled according to the criteria specified above, such that the expansion machine is not overloaded and is started up with its normal rotational speed and power gradient which is markedly lower in a cold start. If, however, on account of the rapid starting and loading of the gas turbo group, the heat exchanger 42 is acted upon comparatively quickly with a high exhaust gas mass flow, the storage fluid mass flow must likewise be increased very quickly in order to avoid an overheating of the heat exchanger apparatus. That is to say, at the outlet from the heat-receiving part 51 of the heat exchanger, both the mass flow and the temperature are increased more quickly than the expansion machine is capable of processing. Consequently, during an starting operation proceeding in this way, in which the heat exchanger 42 is acted upon even with maximum thermal power very quickly, for example within 20 or 30 minutes after the synchronization or after the ignition of the gas turbo group, on the one hand, the actuating element 54 is opened, in order to conduct unheated storage fluid to the mixer 55 and thus lower the temperature of the storage fluid at the inlet into the expansion machine to a value below the temperature of the storage fluid at the outlet from the heat exchanger and to adjust it to a value compatible with the operating state of the expansion machine. A fraction of the overall mass flow $m_{HEX}$ which exceeds the mass flow $m_{AT}$ utilizable by the expansion machine, with the permissible rotational speed and temperature gradients being maintained, is blown off as a blow-off mass flow $m_D$ via the actuating element 53. The actuating element 53 makes it possible, even with the actuating element 52 completely closed, to ensure an at least required throughflow of the heat-receiving part 51 of the heat exchanger 42. This method, although allowing rapid power production by means of the gas turbo group, is nevertheless unfavorable in economic terms in so far as, particularly during a cold start, a considerable mass flow of storage fluid previously compressed in a complicated way has to be discarded, unused, via the blow-off element 53. The branching element 41 is therefore provided with a flap for flow deflection, which allows a variable flow allocation to the two outflow orifices of the branching element, in such a way that variable fractions of the overall exhaust gas mass flow $m_0$ can be conducted to the heat exchanger and to a second branch of the branching element, in this case, therefore, to the stack. The flap of the branching element is therefore designed such that, in addition to a first stationary operating position, in which the overall exhaust gas mass flow is conducted into the heat exchanger, and a second stationary operating position, in which the overall exhaust gas mass flow is conducted into the stack, it has at least one third stationary operating position, in which a first part flow of the exhaust gas is conducted to the heat exchanger and a second part flow into the stack. By means of an arrangement of this type, it is possible to adapt thermal power with which the heat exchanger is acted upon more effectively to the thermal power which can be utilized by the expansion machine. Thus, the unproductively discarded blow-off mass flow $m_D$ can be reduced. Ideally, the flap is continuously adjustable within the branching element 41; in practice, however, this is comparatively difficult to implement, and therefore branching elements are also used in which the flap has discrete intermediate positions for stationary operation. In a way already described above, in so far as the mass flow and temperature limitation of the storage fluid is not predetermined by the states at the inlet of the expansion machine, the starting of the expansion machine can be accelerated, in that the increase in rotational speed of the expansion machine is assisted by the electromotively operated generator. Thus, on the one hand, the mass flow of storage fluid which the expansion machine can utilize rises more quickly. That is to say, less energy in the form of storage fluid discarded via the blow-off element 53 and in the form of exhaust gas from the gas turbo group, conducted, unused, through the stack has to be discarded. Consequently, the starting operation becomes further more energy-efficient. Moreover, the expansion machine 21 can output power into the electricity network more quickly, this likewise affording an economic benefit. The generator 22 of the expansion machine 21 is therefore provided on its electrical side with a starting aid device. Starting devices of this type are known per se from the generators of gas turbo groups and the engines of compressors. The electric machine 12, too, is provided with an starting device of this type which, however, is known per se in this context to a person skilled in the art and which is therefore not illustrated explicitly in the Figure. While gas turbo groups require an starting device of this type so that their compressor is brought to a rotational speed which ensures a minimum mass flow necessary for the ignition of the combustion chamber, steam and air turbines are started up conventionally by applying working fluid to the machines being; an external starting device is per se not necessary. The generator 22 of the expansion machine 21 is connected in a way known per se to the electricity network via a transformer 71 and a network switch 73. For the sake of clarity, instead of the usual three phases of the three-phase network, only a diagrammatic profile is depicted. Between the transformer 71 and the generator 22 the current routing has two branches which can be selected via switches 74 and 75. In the power mode of the expansion machine, the switches 73 and 75 are closed and the switch 74 is open, and the generator 22 feeds electrical power into the network 70. When the expansion machine is starting, the switches 73 and 74 are closed and the switch 75 is opened. The generator 22 is then operated electromotively and asynchronously with respect to the network. In this case, the frequency converter 72, for example what is known as a static frequency converter SFC, converts the alternating current frequency of the network in a way familiar per se to a person skilled in the art, in such a way that it can be utilized by the generator electromotively operated non-synchronously. Thus, the acceleration of the expansion machine can be assisted, with the result that the problem of an excessive rise in the temperature at the outlet of the expansion machine at low rotational speeds is avoided and, at the same time, the starting gradient of the expansion machine is increased. In total, the expansion machine can consequently more quickly be accelerated to the rated rotational speed and the generator 22 operated in the power mode at the network than will be possible if the expansion machine were accelerated only by the power of the storage fluid flowing through.

Figure 2:
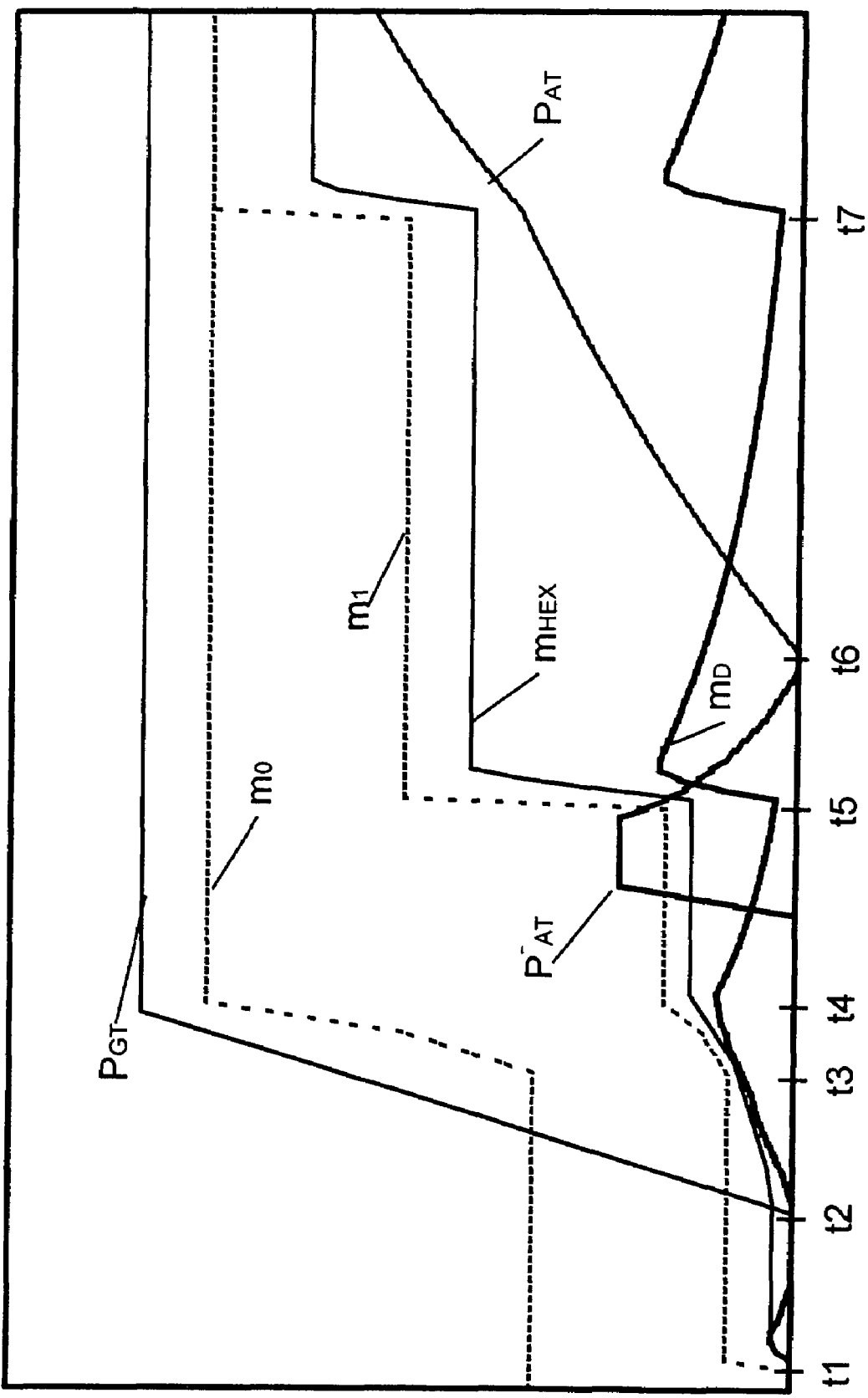
FIG. 2 shows a diagrammatic profile of some operating parameters of the pressure storage plant during an starting operation.

In connection with FIG. 2, then, the operation of starting the storage plant from FIG. 1 is explained, in which the exhaust gas flap of the branching element 41 has two discrete stationary intermediate positions in addition to the positions in which the overall mass flow is routed either to the stack or to the heat exchanger. In FIG. 2, the profile of various mass flows and of the power $P_{GT}$ of the gas turbo group and $P_{AT}$ of the expansion machine are plotted against time. It must be borne in mind, here, that the illustration is not true to scale, but illustrates only different profiles qualitatively, in order to make it easier to understand the starting operation. In particular, the illustration in FIG. 2 serves for showing how the exhaust gas mass flow $m_D$ is minimized and, at the same time, the loading speed is maximized by means of the starting method characterized in the claims and the storage plant characterized in the device claims. In a first phase of the starting operation, which is not illustrated in the graph and which occurs as it were on the left of the illustration, the gas turbo group is ignited and accelerated to the rated rotational speed. In this case, the flap of the branching element 41 is set such that the overall exhaust gas mass flow $m_0$ of the gas turbo group is routed past the heat exchanger 42. The flap is brought at the time point t1 into a first position in such a way that a first part flow $m_1$ of the exhaust gas mass flow $m_0$ is conducted into the heat exchanger. The throughflow regulation of the heat exchanger reacts to the application of hot exhaust gases with a delay caused by the thermal inertia of the heat exchanger. The actuating element 53 is opened, and the throughflow through the heat-receiving part 51 of the heat exchanger is adjusted such that an overheating of the heat exchanger is avoided. As a result, the mass flow $m_D$ initially rises. As soon as possible, the mass flow $m_{AT}$, not illustrated, is increased, in order to start the operation of heating up the expansion machine, and the mass flow $m_D$ is correspondingly lowered. At the time point t2, the gas turbo group is synchronized and its power is increased with a normal power gradient. A gas turbo group which is not designed especially for peak load reaches its maximum power typically within around 20 minutes to half an hour after synchronization, deviations from these illustrative time indications being readily possible. In the example illustrated, at the time point t4, the gas turbo group has reached its maximum power and dwells there; however, in the device illustrated and the method explained here, it is readily possible to operate the gas turbo group, as desired, according to the power requirements of the network, independently of the starting operation otherwise taking place. With an increasing power of the gas turbo group, its exhaust gas temperature also rises and, consequently, the thermal power to be converted in the heat exchanger rises, too. After synchronization, therefore, the storage fluid mass flow $m_{HEX}$ increases in the heat exchanger. Because this increasing mass flow and the rising temperature cannot be processed immediately by the expansion machine, the blow-off mass flow $m_D$ also rises. In the period of time between t3 and t4, an a row of variable inlet guide vanes of the compressor of the gas turbo group is opened, and therefore the exhaust gas mass flow $m_0$ and, with the position of the exhaust gas flap in the branching element 41 remaining the same, the mass flow $m_1$ in the heat-discharging part of the heat exchanger 42 are increased. This results in an increased rise of the storage fluid mass flow $m_{HEX}$ through the heat exchanger. Meanwhile, the expansion machine 21 is heated up further and is therefore capable of processing a higher mass flow. At the same time, the temperature of the storage fluid flowing to the expansion machine can be lowered, in that an unheated storage fluid mass flow, which is dimensioned by the actuating element 54, is admixed to the storage fluid in the mixer 55. The mass flow utilizable by the expansion machine therefore increases, and the blow-off mass flow $m_D$ does not follow the rise of the storage fluid mass flow $m_{HEX}$ to the full extent because the expansion machine is increasingly capable of utilizing higher mass flows. As already mentioned several times, the mass flow of the expansion machine can additionally be increased more quickly when the expansion machine is started up and accelerated to the rated rotational speed with the assistance of the electromotively operated generator. After the maximum power of the gas turbo group is reached, an initially constant value for the overall storage fluid mass flow $m_{HEX}$ is set. The blow-off mass flow decreases continuously. When the blow-off mass flow $m_D$ drops below a limit value, the flap in the branching element 41 is set to a second intermediate position at the time point t5. With this step, it is possible, in principle, also to wait until the blow-off mass flow has fallen to zero; in the exemplary embodiment, however, in the interests of a rapid power output, this step takes place even when the blow-off mass flow has dropped below a limit value. The part flow $m_1$ of the overall exhaust gas mass flow which flows to the heat exchanger increases. The storage fluid mass flow $m_{HEX}$ increases correspondingly, this increase being delayed due to the thermal inertia of the heat exchanger. On account of the abrupt rise in the thermal power to be converted, the blow-off mass flow $m_D$ also increases initially, in order thereafter to decrease again with a progressive heating of the storage fluid expansion machine. At the time point t7, the exhaust gas flap in the branching element is brought into a position in which the overall exhaust gas mass flow of the gas turbo group flows through the heat exchanger. This results in a further rise of the storage fluid mass flow $m_{HEX}$ and of the blow-off mass flow $m_D$, the latter falling to zero, with the progressive heating of the storage plant, in a way which is not illustrated, but is understandable to a person skilled in the art. At a time point between t4 and t5, the starting device of the expansion machine is put into operation. This absorbs the power $P_{-AT}$. With an increasing rotational speed of the expansion machine, an ever larger fraction of the acceleration power of the expansion machine can be applied by the storage fluid flowing through, and therefore the power consumption $P_{-AT}$ falls again; at the latest when the rated rotational speed is reached, this has, of course, fallen to zero. At the time point t6, the storage fluid expansion machine is synchronized and its power $P_{AT}$ is increased. The storage fluid expansion machine approximately then reaches essentially its maximum power output when the blow-off mass flow $m_D$ has fallen to zero. The operationally necessary loss of storage fluid arises from the integral below the profile curve of the blow-off mass flow. This, of course, becomes the lower, the more quickly the storage fluid expansion machine is capable of processing a high mass flow of storage fluid at high temperature. Furthermore, this loss becomes the lower, the more stationary intermediate positions the exhaust gas flap in the branching element 41 has, that is to say the smaller the mass flow jumps in the heat-discharging part of the heat exchanger are. In the case of a continuously adjustable exhaust gas flap, these losses can be reduced to zero or at least near to zero. As described above, furthermore, the storage fluid loss can be reduced, in that, in the mixer 55, the temperature of the storage fluid flowing to the storage fluid expansion machine is reduced and is adapted to a temperature compatible with the operating state of the storage fluid expansion machine. The starting assistance of the expansion machine by the electromotively operated generator can likewise reduce this loss further.

In light of these statements, a multiplicity of further embodiments encompassed within the scope of the invention are afforded to a person skilled in the art. The exemplary embodiments illustrated in order to explain the invention may not in this case, of course, be conclusive. In particular, a gas turbo group with sequential combustion, such as has become known from EP 620 362, may be used. For example, two or more gas turbo groups may act on a common heat exchanger. Furthermore, the charging compressor 13 may be arranged on a separate power train with an engine; furthermore, here, in general, a plurality of compressors connected in series are used, although this is not illustrated because it is not essential to the invention. Embodiments of the invention which go beyond these examples are, of course, also included.

LIST OF REFERENCE SYMBOLS

11 Gas turbo group
12 Motor generator unit, electric machine
13 Compressor
14 Clutch
15 Clutch
21 Stored fluid expansion machine; air turbine
22 Generator
30 Storage volume
31 Nonreturn element
32 Cooler
34 Shut-off element
35 Shut-off and/or actuating element; "Wellhead"
41 Flow branching element; branching element, with exhaust gas flap
42 Heat exchanger
43 Stack
51 Heat-receiving part of the heat exchanger
52 Actuating element, control valve
53 Actuating element, bypass valve
54 Actuating element, mixing valve
55 Mixer
60 Control unit
61 Input signals of the control unit
62 Output signals of the control unit, control variables
63 Data carrier
70 High-voltage network
71 Network transformer
72 Starting device, frequency converter
73 Network switch
74 Starter switch
75 Power switch
111 Compressor of the gas turbo group
112 Combustion chamber
113 Turbine of the gas turbo group
$n_{AT}$ Rotational speed of the expansion machine
$m_0$ Exhaust gas mass flow
$m_1$ First part flow of the exhaust gas mass flow
$m_2$ Second part flow of the exhaust gas mass flow
$m_{AT}$ Mass flow of the expansion machine
$m_D$ Blow-off mass flow, bypass mass flow
$m_{HEX}$ Storage fluid mass flow through the heat exchanger
$p_{HEX}$ Pressure of the storage fluid in the heat exchanger
$P_{GT}$ Power output of the gas turbo group
$P_{AT}$ Power output of the expansion machine
$P_{-AT}$ Power consumption of the starting aid device of the expansion machine
$T_{AT}$ Temperature of the expansion machine
$T_{ex}$ Temperature of the storage fluid downstream of the heat exchanger

The invention claimed is:

1. A method for activating a pressure storage plant, the pressure storage plant comprising: a storage volume for a pressurized storage fluid, a storage fluid expansion machine capable of being acted upon solely by the pressurized storage fluid, and a generator which is arranged with the expansion machine on a common power train, and said method comprising bringing the expansion machine to an operating rotational speed, synchronizing the generator with an electricity network and operating the expansion machine for the output of power into the electricity network, a first storage fluid mass flow ($m_{HEX}$) being extracted from the storage volume, and at least one partial mass flow of the first storage fluid mass flow being provided as a second storage fluid mass flow ($m_{AT}$) for the storage fluid expansion machine and being expanded in the storage fluid expansion machine with the output of power, characterized in that, during the acceleration of the storage fluid expansion machine, the generator is operated at least temporarily electromotively to assist the acceleration of the storage fluid expansion machine.

2. The method as claimed in claim 1, wherein a minimal second storage fluid mass flow is supplied to the expansion machine when the latter is still at a standstill and/or the rotor is in rotor turning, and the expansion machine is accelerated from standstill or from rotor turning.

3. The method as claimed in claim 1, wherein the temperature of the second storage fluid mass flow supplied to the expansion machine is controlled such that the temperature and/or the temperature gradient of the expanded storage fluid at the outlet from the expansion machine remain/remains below a limit value.

4. The method as claimed in claim 1 wherein the temperature of the second storage fluid mass flow supplied to the expansion machine is controlled such that the temperature gradient of the rotor temperature and/or of the casing temperature at the outlet of the expansion machine remain/remains below a limit value.

5. The method as claimed in claim 1, wherein the temperature of the second storage fluid mass flow supplied to the expansion machine is controlled such that the temperature and/or the temperature gradient of the storage fluid at the inlet into the expansion machine remain/remains below a limit value.

6. The method as claimed in claim 1, wherein the temperature of the second storage fluid mass flow supplied to the expansion machine is controlled such that the temperature gradient of the rotor temperature and/or of the casing temperature at the inlet of the expansion machine remain/remains below a limit value.

7. The method as claimed in claim 3, wherein at least one limit value is defined dynamically as a function of a current thermal state of the expansion machine.

8. The method as claimed in claim 1, wherein the temperature of the second storage fluid mass flow supplied to the expansion machine is controlled such that the temperature and/or the temperature gradient of the storage fluid at the inlet into the expansion machine is set at a desired value, and the rotational speed of the expansion machine is increased by means of the electromotively operated generator such that the temperature and/or the temperature gradient of the expanded storage fluid at the outlet of the expansion machine remain/remains below a limit value.

9. The method as claimed in claim 1, wherein the temperature of the second storage fluid mass flow supplied to the expansion machine is controlled such that the temperature and/or the temperature gradient of the storage fluid at the inlet into the expansion machine is set at a desired value, and the rotational speed of the expansion machine is set such that the temperature gradient of the casing temperature and/or of the rotor temperature at the outlet of the expansion machine remain/remains below a limit value.

10. The method as claimed in claim 8, wherein the desired value is defined dynamically as a function of a current thermal state of the expansion machine.

11. The method as claimed in claim 1, wherein heat is supplied to the storage fluid prior to expansion in the expansion machine.

12. The method as claimed in claim 11, wherein the heat is supplied by heat exchange.

13. The method as claimed in claim 12, wherein the heat is supplied by heat exchange with the exhaust gas of a gas turbo group.

\* \* \* \* \*